(12) United States Patent
Rudy et al.

(10) Patent No.: US 7,178,981 B2
(45) Date of Patent: Feb. 20, 2007

(54) LINEAR ROLLER BEARING

(75) Inventors: Dietmar Rudy, Kleinbudenbach (DE); Peter Lutz, Kottweiler (DE); Martin Menges, Homburg (DE)

(73) Assignee: Schaeffler KG, Herzogenaurach (DE)

( * ) Notice: Subject to any disclaimer, the term of this patent is extended or adjusted under 35 U.S.C. 154(b) by 14 days.

(21) Appl. No.: 11/212,089

(22) Filed: Aug. 25, 2005

(65) Prior Publication Data

US 2006/0013515 A1    Jan. 19, 2006

Related U.S. Application Data

(63) Continuation of application No. PCT/EP2004/001039, filed on Feb. 5, 2004.

(30) Foreign Application Priority Data

Feb. 25, 2003   (DE)  ............................... 103 07 882

(51) Int. Cl.
*F16C 29/06*    (2006.01)
(52) U.S. Cl. ............................. 384/8; 384/45
(58) Field of Classification Search ............ 384/8, 384/43, 45

See application file for complete search history.

(56) References Cited

FOREIGN PATENT DOCUMENTS

| | | |
|---|---|---|
| DE | 41 28 807 | 3/1993 |
| DE | 42 18 949 | 12/1993 |
| DE | 195 22 543 | 2/1996 |
| DE | 43 95 740 | 6/1997 |
| DE | 196 47 939 | 5/1998 |
| DE | 197 13 688 | 10/1998 |
| DE | 197 42 081 | 3/1999 |
| DE | 199 19 006 | 11/2000 |
| DE | 199 41 587 | 3/2001 |
| DE | 100 17 572 | 10/2001 |
| DE | 101 36 438 | 3/2002 |
| DE | 101 44 269 | 3/2003 |
| EP | 0 558 761 | 7/1997 |

*Primary Examiner*—William C Joyce
(74) *Attorney, Agent, or Firm*—Volpe and Koenig, P.C.

(57) ABSTRACT

A linear roller bearing is provided having a guide carriage (1) which can be mounted on a guide rail (2) in a rolling manner via roller bodies (4). The guide carriage is provided with at least one continuous roller body channel (3) for the roller bodies (4). The roller body channel (3) includes a support channel (5) for supporting the roller bodies (4), a return channel (11) for returning the roller bodies (4), and deflecting channels (10) which connect the support channel (5) to the return channel (11). The deflecting channels (10) are provided in end elements (9) of the guide carriage (1), and the roller bodies (4) in the roller body channel (3) are subject to displacement resistance in the direction of rotation. The end elements (9) are respectively provided with a sensor (12), whereby a preferably electric sensor signal therefrom is dependent on the displacement resistance.

17 Claims, 3 Drawing Sheets

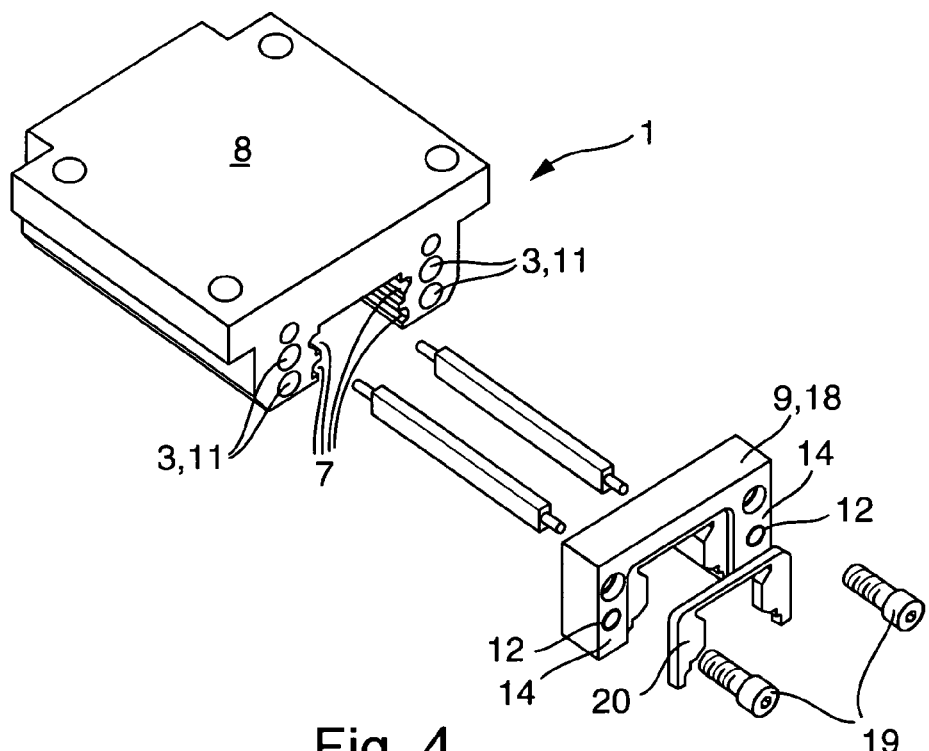
Fig. 4
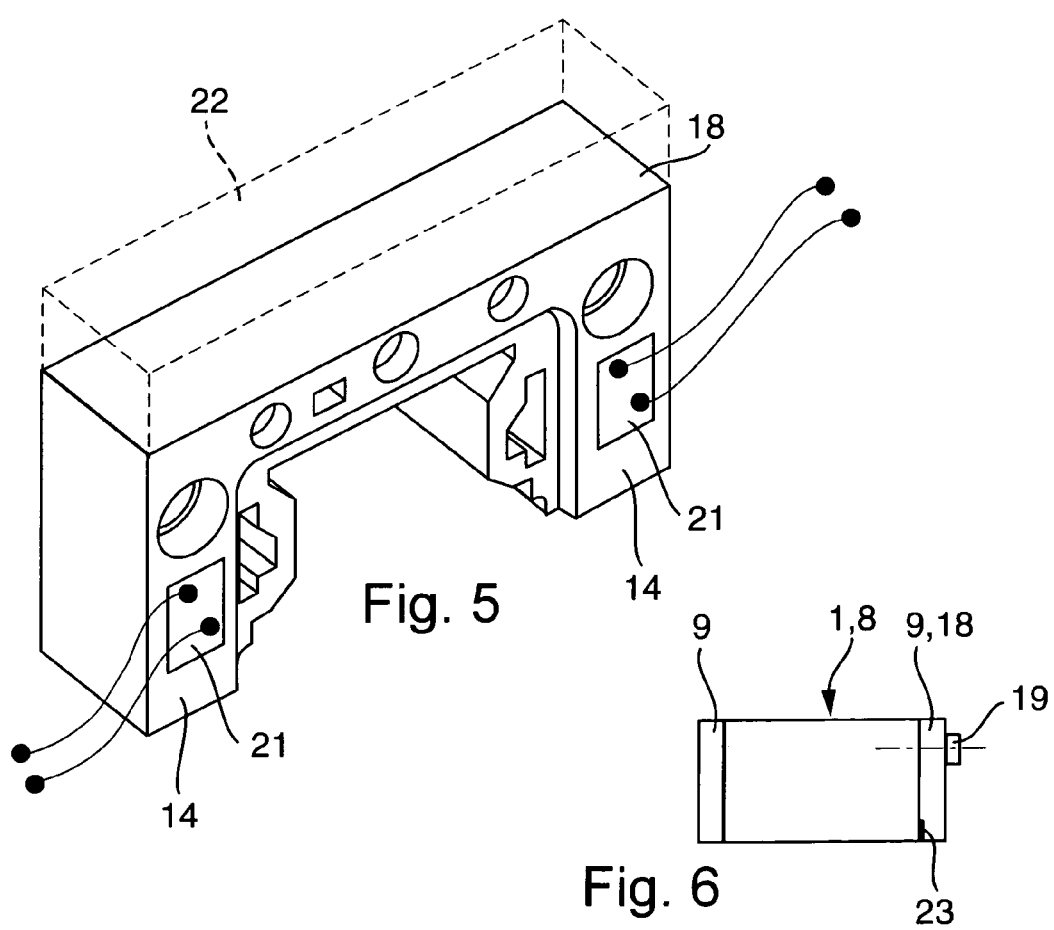
Fig. 5
Fig. 6

LINEAR ROLLER BEARING

FIELD OF THE INVENTION

The present invention relates to linear roller bearings. Such linear roller bearings are used, for example, in machine tools, but also in component-placement machines, or generally in production lines. With these means and measures, machine parts can be guided in the longitudinal direction without problem and with high precision.

BACKGROUND

For example, from EP-0558761B1, a linear roller bearing has become known with a guide carriage, which is supported by rollers on a guide rail by means of balls and which is provided with several endless ball channels for the balls. Each ball channel comprises a bearing channel for ball bearings, wherein these balls roll in raceways of the guide rail and the guide carriage. Each ball channel further comprises a return channel, in which the balls are returned load-free. Furthermore, the ball channel comprises two deflecting channels connecting the bearing channel to the return channel in an endless fashion. These deflecting channels are formed on end elements of the guide carriage. If the balls arranged one behind the other in the peripheral direction are designated as an endless ball chain, then this ball chain is subjected to displacement resistance in the rotational direction. This displacement resistance is traced back to friction between parts moving relative to each other or to lubricating means provided for lubricating the ball chain in the ball channel or to foreign matter in the ball channel.

Such linear roller bearings—whether those with balls or those with rollers—are often used in an environment, in which, for example, foreign matter finds its way onto the guide rail and thus also onto the guide carriage. To prevent foreign matter from finding its way into the roller body channel, linear roller bearings have been proposed, in which seals and strippers are used, which should keep the foreign matter from the guide carriage. It has been determined that such strippers and seals become damaged easily and therefore their function cannot be fulfilled perfectly. Such linear roller bearings are often installed at positions, which are accessible only with difficulty from the outside, but which, in any case, can be seen only with difficulty or even not at all. Therefore, damage to the linear roller bearings is not noticed immediately. Such damage can be caused by undesired foreign-matter deposits or else also by lack of lubrication. In the formation of pits or foreign-matter deposits, particles find their way into the roller body circuit, which increases the displacement resistance of the roller body chain.

For the case of lack of lubrication, from DE 19647939 A1 a roller bearing element has become known, in which a relubricating device is provided in order to bring lubricant into the roller body channel if needed. To monitor the relubrication, there can be sensors (pressure sensors, fluid detectors, proximity switches, or the like). However, the formation of pits or undesired foreign-matter deposits is not monitored in such linear bearing elements.

SUMMARY

The objective of the present invention is to provide a linear roller bearing for which deterioration of the track properties can be determined without a problem.

According to the invention, this objective is addressed in that the end elements are each provided with a sensor, whose signal (preferably electrical) is dependent on the displacement resistance. It has been determined that, under the displacement resistance, a force acts on the end element. In the end element, the deflecting channel is arranged. If the roller body chain is to be moved only under an increased displacement resistance, a force acts in the rotational direction, which presses in the region of the deflecting channel with a component axially against the end element. The end element can deform under this force. Thus, deformation of the end element can be set. Both a deformation of the end element, and also a force component acting on the end element as a result of the increased displacement resistance can be detected by the sensor as a physical parameter and can be converted, for example, into an electrical signal. Thus, the sensor outputs a signal, from which the value of the physical parameter and finally the displacement resistance can be determined.

In a known way, such sensors can be connected to an evaluation unit, which can trigger, for example, an acoustic alarm signal. Consequently, maintenance personnel are informed promptly on the deteriorated track properties before total failure of the linear roller bearing. At times of standstill, thus, for example, on weekends, such defective linear roller bearings can be exchanged with replacement linear roller bearings. Production standstill can be prevented with the invention. For known linear roller bearings, it cannot be excluded that due to a very high displacement resistance, the forces acting on the end element lead to the result that the end element preferably produced from plastic in an injection-molding process is destroyed and balls fall out from the linear roller bearing. Machines equipped with linear roller bearings with such damage are no longer functional.

If the displacement resistance increases and, for example, an acoustic signal reports this increase in the displacement resistance, it may also be sufficient to initiate a flushing process, with which, for example, undesired foreign matter in the roller body channel is flushed out. Lubricant can be introduced via suitable feeding devices into the linear roller bearing. If such alarm signals occur repeatedly, it may be an indication to replace these bearings with perfect bearings.

All sensor types are can be utilized that can detect physical parameters, which enable a conclusion on the displacement resistance in the roller body channel. Sensors can be used that measure a deformation or also a force. Preferred embodiments are described below.

Sensors formed as sensor films are suitable particularly for use in linear roller bearings according to the invention. This is because these films are very thin and very small in size and can be applied without a problem, for example, to the front surfaces of the end elements. Such sensor films usually have attachment wires, which can be connected to an evaluation unit. These evaluation units can likewise be integrated into the end element.

The sensor can also be formed as a sensor switch, which triggers a switching signal when the displacement resistance exceeds a threshold. The threshold can be determined in field tests. It may be adequate if the exceeding of this threshold is reported only once. Beneath this threshold, the perfect function of the linear roller bearing according to the invention is still given.

Typically, the end element is formed by a head piece, which is connected via attachment means, especially screws, to a support body of the guide carriage, wherein, according to the invention, the sensor is actively arranged between the attachment means and the head piece. If the head piece is pressed axially away from the support body under the force of the increased displacement resistance, this increased pressure is transferred to the sensor, which is supported on the attachment means. A practical solution provides that a screw shaft of the screw is led through a passage opening in the head piece, wherein a screw head of the screw is supported on a shoulder of the head piece, and wherein the sensor is arranged between the screw head and the shoulder. The sensor is therefore loaded with elevated pressure when the displacement resistance in the roller body channel is increased.

If the head piece is tightened by means of screws onto the support body of the guide carriage, the sensor can be actively arranged between the support body and the head piece. Under the biasing force of the screws, the sensor is biased with pressure between the support body and the head piece. If the displacement resistance in the roller body channel is increased, the head piece presses it away from the support body under the axially acting force of the displacement resistance. This force counteracts the biasing force of the screws. Consequently, the pressure load acting on the sensor is reduced. This change in the pressure load can be detected by the sensor and transmitted, wherein, for example, an alarm signal can be triggered if the load falls below a threshold.

In a practical configuration of the latter improvement according to the invention, the screw shaft of the screw can be guided through the passage opening of the head piece, wherein a screw head of the screw is supported on a shoulder of the head piece, and wherein the sensor is arranged between the head piece and the support body.

The sensor can be formed with a ring shape as a ring sensor. Here, force sensors (e.g., piezoelectric sensors, electrically conductive plastics, or DMS sensors) can be used.

The head pieces typically have a U-shaped formation, wherein the two legs of the head piece gripping around the guide rail are bent under the load of the displacement resistance. This bending can be detected by the sensors. Consequently, the sensors can be preferably mounted on the legs.

The head pieces typically produced from plastic in an injection-molding process also enable an improvement according to the invention, for which the sensor is embedded in the plastic. For example, the sensor can already be laid in the injection molding die. Special measures for mounting the sensor can be eliminated. In addition, the plastic embedded in the plastic is kept away from undesired external effects.

Further, as was already mentioned above, the signal of the sensor can be transmitted to an evaluation unit. The connection between the sensor and the evaluation unit can be guaranteed via wiring, but also wirelessly, for example, via a radio connection. However, the evaluation unit can also be integrated into the head piece.

BRIEF DESCRIPTION OF THE DRAWINGS

The invention is explained in more detail below with reference to three embodiments shown in a total of seven figures of the drawings. Shown are:

FIG. 4 is an exploded view of the linear roller bearing according to the invention from FIG. 1, FIG. 5 is a view of a modified head piece of the linear roller bearing according to the invention from FIG. 1, FIG. 6 is a simplified view of a linear roller bearing according to the invention with a modified sensor arrangement.

DETAILED DESCRIPTION FO THE PREFERRED EMBODIMENTS

Figure 1:
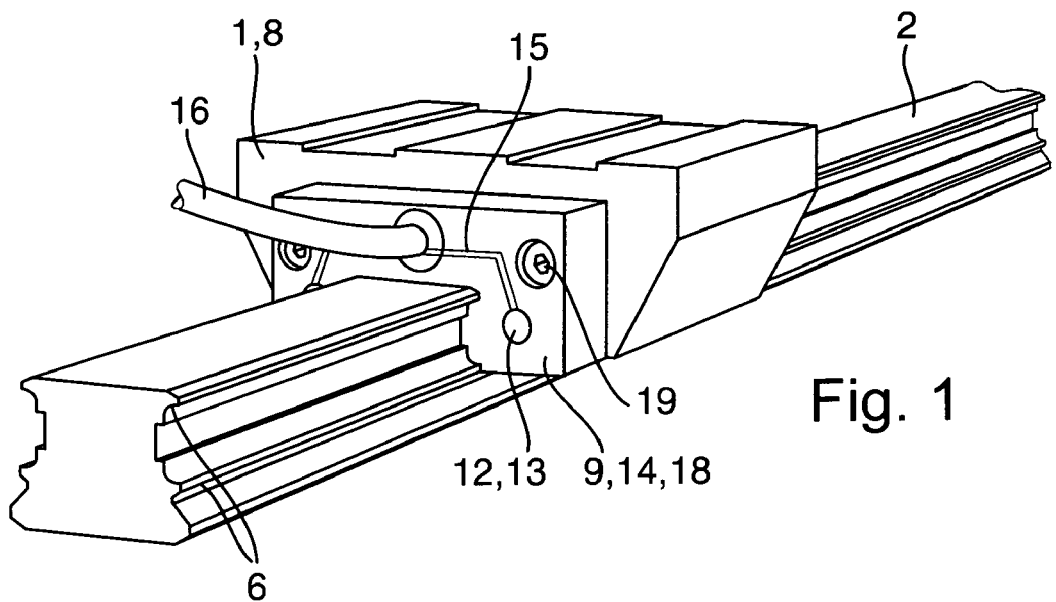
FIG. 1 is a perspective view of a linear roller bearing according to the invention.
Figure 2:
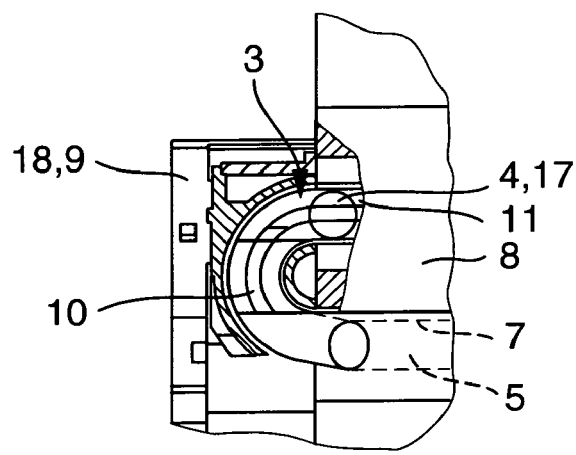
FIG. 2 is a partial section through the linear roller bearing according to the invention from FIG. 1.

The linear roller bearing illustrated in FIGS. 1–4 has a guide carriage 1, which is supported by rollers on a guide rail 2. The guide carriage 1 comprises two endless roller body channels 3 for roller bodies 4, of which one is indicated in FIG. 2, one on each of the two longitudinal sides of the guide rail 2. Each roller body channel 3 comprises a support channel 5 for supporting roller bodies 4. In the support channel 5, the roller bodies 4 roll on raceways 6, 7, wherein one raceway 6 is formed on the guide rail 2 and the other raceway 7 is formed on the support body 8 of the guide carriage 1.

An end element 9, on which a deflecting channel 10 is formed, is arranged on each of the two front sides of the carrier body 8. The roller body channel 3 further comprises a return channel 11, which is formed on the support body 8. The two deflecting channels 10 connect the support channels 5 to the return channels 11 at the endless roller body channel 3, in which the roller bodies 4 run in an endless fashion.

Figure 3:
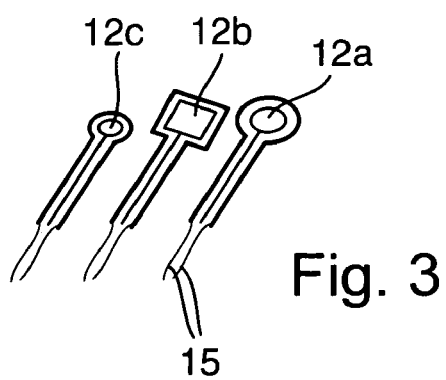
FIG. 3 is a view of alternative embodiments of a detail part of the linear roller bearing according to the invention from FIG. 1.

The end elements 9 are each provided with a sensor 12, which is formed as a sensor film 13. FIG. 3 shows various physical embodiments 12a, 12b, 12c of the sensor 12.

It follows from FIG. 1 that a sensor 12 is mounted on each leg 14 of the U-shaped end element 9 on its outer front side. Connection wires 15 end in a transmission cable 16, which is connected to an evaluation unit (not shown).

The roller bodies 4 arranged in the endless roller body channel 3 form a chain, which is designated below as a roller body chain 17. If this roller body chain 17 rolls in the rotational direction in the roller body channel 3, it overcomes a displacement resistance. This displacement resistance can be influenced by several parameters. On one hand, the lubricant provided in the roller body channel 3 damps the rotational movement of the roller body chain 17. On the other hand, it cannot be excluded that lubricant particles or other undesired foreign matter finds its way into the roller body channel 3. Due to these foreign-matter deposits, the displacement resistance can be further increased. This displacement resistance expresses itself in the support channel 5 and in the return channel 11 as an axial force, which is transmitted along the roller body chain 17. In the deflecting region, this axial displacement force also acts in the axial direction on the end element 9.

The end element 9 is presently formed as a head piece 18 produced from plastic in an injection-molding process, wherein the sensors 12 are embedded in the plastic.

It can be seen from FIGS. 1 and 4 that the head piece 18 is mounted detachably onto the support body 8 of the guide carriage 1 by means of screws 19.

Under the effect of the displacement resistance, the legs 14 of the U-shaped head piece 18 are loaded to bending, whereby the legs 14 are bent away from the support body 8.

The deformation caused by this bending can be detected by the sensors 12 and transmitted via electrical signals to the evaluation unit. If this deformation of the legs 14 reaches a critical value, the evaluation unit can trigger an alarm, for example, which indicates to the maintenance personnel that the displacement resistance in the roller bearing is unacceptably high and remedial actions are to be performed.

It is also shown in FIG. 4 that a stripper 20, whose task it is to strip foreign particles from the guide rail 2, so that foreign-matter deposits in the roller body channel 3 are prevented, is arranged on the outer front side of the head piece 8.

FIG. 5 shows the head piece 18 with modified sensors, which here are formed as sensor switches 21. These sensor switches 21 react just like those previously described to the deformation of the legs 14 of the head piece 18, wherein here, however, a switching signal is transmitted at critical bending.

An evaluation unit 22 shown here with only dashed lines is integrated into the head piece 18. The sensor switches 21 are connected electrically to the evaluation unit 22. The sensor switches 21 shown here can obviously be replaced by other suitable sensor types and connected to the evaluation unit 22.

FIG. 6 shows in a simplified view a linear roller bearing according to the invention, but with a modified sensor arrangement. A sensor 23 is here arranged between the end element 9 formed as a head piece 18 and the support body 8 of the guide carriage 1. In this case, the sensor 23 is a force sensor, which is loaded with pressure under the biasing force of the screws 19. Under the displacement resistance mentioned farther above, the axial force acts on the head piece 18, which is pressed away from the support body 8. This means that the pressure load acting on the sensor 23 decreases the more the displacement resistance increases. This means that, in this arrangement, the displacement resistance can be determined without a problem via the sensor 23. Just like in the other embodiments, the sensor 23 is connected to an evaluation unit, in order to trigger, for example, an alarm signal when a critical displacement resistance is reached.

Figure 7:
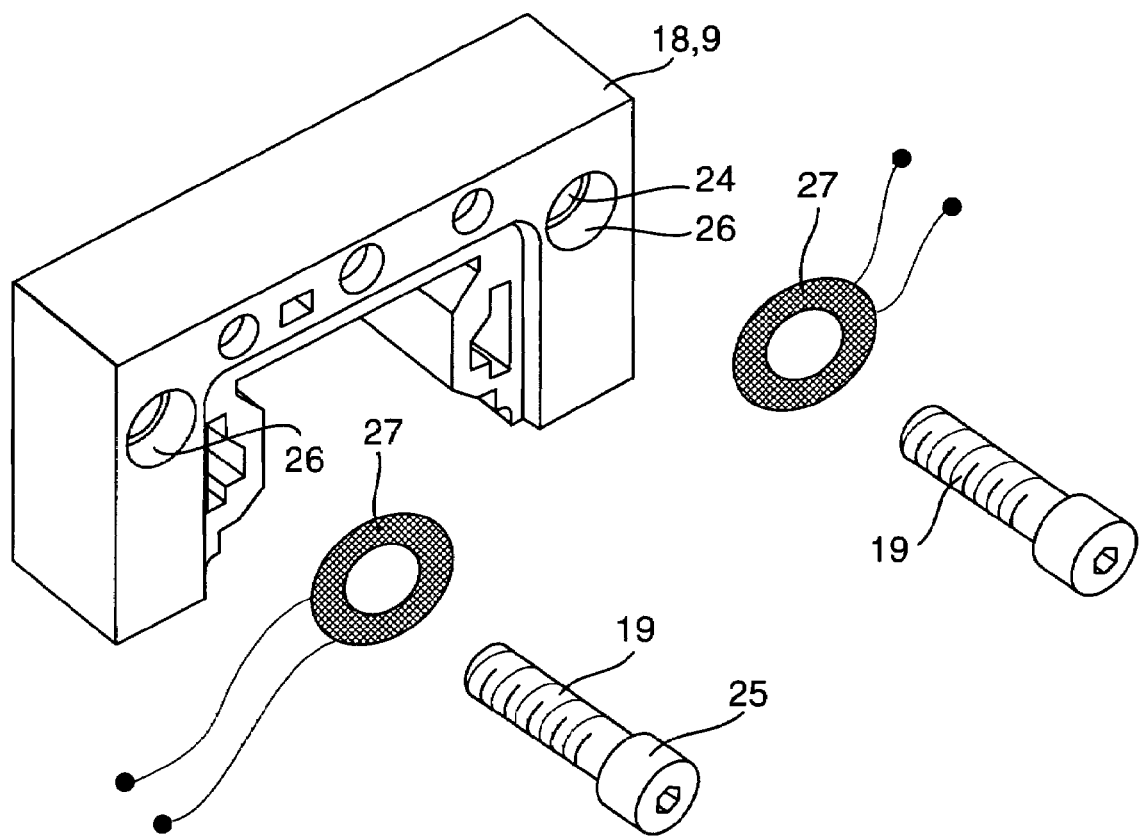
FIG. 7 is a view of the head piece as in FIG. 5, but with modified sensors, and without an integrated evaluation unit.

FIG. 7 shows the head piece 18 of the linear roller bearing according to the invention with a modified sensor arrangement. It can be seen from the figure that the head piece 18 has through holes 24 for the screws 19. The screw shaft is guided through the through hole 24, wherein the screw head 25 is supported on a shoulder 26 of the head piece 18, and wherein a ring-shaped sensor 27 on the screw shaft is arranged between the screw head 25 and the shoulder 26. Because the sensor 27 is countersunk in the head piece 18 and covered by the screw head 25, damage of the ring sensor 27 from the outside is excluded. Here, the ring sensor 27 is a force sensor, which can be formed, for example, through piezoelectric sensors, electrically conductive plastics, or DMS sensors. After tightening the screws 19, a known bias load acts on the ring sensor 27 under the tension force of the screws 19. Under the influence of the displacement resistance, the head piece 18 presses the screw 19 in the direction towards the screw head 25. This means that a pressure force acting on the ring sensor 27 increases. The ring sensor can react to this increase in pressure force and, if necessary, can trigger an alarm signal by means of the attached evaluation unit.

The sensor monitoring increases the operating reliability of the linear roller bearing according to the invention. Before total failure, an alarm signal can be triggered. The linear roller bearing can be relubricated. Through the relubrication, foreign particles can be flushed out of the roller body channel and lack of lubrication can be rectified. If repeated alarms are triggered, stoppage for maintenance can be scheduled outside of the production time. Consequently, unexpected production outages triggered by a failure can be prevented with the linear roller bearing according to the invention.

For the present invention, all sensors are suitable that permit the generation of a usually electrical signal as a function of a physical or geometrical parameter. Such sensors react to these physical parameters and usually output an electrical signal, from which the value of the physical parameter can be determined. In the preceding embodiments, it was discussed that the force acting on the end element or its deformation can be detected as the physical parameter. The relationship between this force or the deformation and the displacement resistance acting in the roller body channel can be determined in series of tests. Due to this known relationship, the sensors can be calibrated without any problem, so that signals transmitted by the sensor allow problem-free conclusions on the active displacement resistance to be made.

REFERENCE NUMBERS

1 Guide carriage
2 Guide rail
3 Roller body channel
4 Roller body
5 Support channel
6 Raceway
7 Raceway
8 Support body
9 End element
10 Deflecting channel
11 Return channel
12 Sensor
13 Sensor film
14 Leg
15 Connecting wire
16 Transmission cable
17 Roller body chain
18 Head piece
19 Screw
20 Stripper
21 Sensor switch
22 Evaluation unit
23 Sensor
24 Through hole
25 Screw head
26 Shoulder
27 Ring sensor

The invention claimed is:

1. Linear roller bearing comprising a guide carriage (1), which can be supported by rollers on a guide rail (2) via roller bodies (4) and which is provided with at least one endless roller body channel (3) for the roller bodies (4), wherein the roller body channel (3) has a support channel (5) for supporting the roller bodies (4), a return channel (11) for returning the roller bodies (4), and deflecting channels (10) connecting the support channel (5) to the return channel (11), wherein the deflecting channels (10) are provided on end elements (9) of the guide carriage (1), and wherein the roller bodies (4) in the roller body channel (3) are subject to a displacement resistance in a rotational direction, the end elements (9) are each provided with a sensor (12) that generates a signal that is dependent on the displacement resistance.

2. Linear roller bearing according to claim 1, wherein the sensor (12) detects deformation of the end element (9).

3. Linear roller bearing according to claim 1, wherein the sensor (12) detects a pressure or force acting on the end element (9).

4. Linear roller bearing according to claim 1, wherein the sensor is formed as a sensor film (13).

5. Linear roller bearing according to claim 1, wherein the sensor is formed as a sensor switch (21), which triggers a switching signal if the displacement resistance exceeds a threshold.

6. Linear roller bearing according to claim 1, wherein the end element (9) is formed by a head piece (18), that is connected via attachment fasteners (19) to a support body (8) of the guide carriage (1), and the sensor (27) is actively arranged between the attachment fasteners and the head piece (18).

7. Linear roller bearing according to claim 6, wherein a shaft of the fastener (19) is guided through a passage opening of the head piece (18), a head (25) of the fastener is supported on a shoulder (26) of the head piece (18), and the sensor (27) is arranged between the fastener head (25) and the shoulder (26).

8. Linear roller bearing according to claim 1, wherein the end element (9) is formed by a head piece (18), that is connected via attachment fasteners (19), to a support body (8) of the guide carriage (1), wherein the sensor (23) is actively arranged between the support body (8) and the head piece (18).

9. Linear roller bearing according to claim 8, wherein a fastener shaft of the fastener (19) is guided through a passage opening of the head piece (18), a fastener head (25) of the fastener (19) is supported on a shoulder (26) of the head piece (18), and wherein the sensor (23) is arranged between the head piece (18) and the support body (8).

10. Linear roller bearing according to claim 1, wherein the sensor (12) is integrated into a head piece (18) forming the end element (9).

11. Linear roller bearing according to claim 10, wherein the head piece (18) is produced from plastic and the sensor (12) is embedded in the plastic.

12. Linear roller bearing according to claim 11, wherein the head piece is produced in an injection-molding process.

13. Linear roller bearing according to claim 1, wherein the signal of the sensor (12, 13, 21, 23, 27) is transmitted to an evaluation unit (22).

14. Linear roller bearing according to claim 13, further comprising wiring between the sensor (12, 13) and the evaluation unit (22).

15. Linear roller bearing according to claim 13, wherein the signal of the sensor (12) is transmitted wirelessly, e.g., via radio, to the evaluation unit.

16. Linear roller bearing according to claim 13, wherein the evaluation unit (22) is integrated into the head piece (18).

17. Linear roller bearing according to claim 1, wherein the sensor produces an electric signal.

* * * * *